March 8, 1949.　　　　H. H. HORTH　　　　2,464,038
TURF TREATING MACHINE

Filed Sept. 27, 1946　　　　　　　　　　　　2 Sheets-Sheet 1

INVENTOR
Homer H. Horth
BY
Evans & McCoy
ATTORNEYS

March 8, 1949.  H. H. HORTH  2,464,038
TURF TREATING MACHINE
Filed Sept. 27, 1946  2 Sheets-Sheet 2

INVENTOR
Homer H. Horth
BY
Evans + McCoy
ATTORNEYS

Patented Mar. 8, 1949

2,464,038

UNITED STATES PATENT OFFICE 2,464,038

TURF TREATING MACHINE

Homer H. Horth, Cleveland, Ohio

Application September 27, 1946, Serial No. 699,618

1 Claim. (Cl. 97—52)

This invention relates to an apparatus for and process of treating or conditioning turf, and is particularly adapted to the improvement and maintenance of turf such as may be found on the fairways and greens of golf courses and the like.

It is an object of the present invention to provide a process of treating or conditioning turf in which the root structure of the turf may be lightened, aerated and provided with suitable treating composition, whether solid or liquid, and in which the surface roots of trees and the like will be greatly reduced, resulting in a healthier, stronger, deeper rooted, and more resilient turf.

Another object is to provide apparatus for and a process of treating or conditioning turf which permits access to the root structure and at the same time permits isolation of undesirable portions of the turf which may be readily removed and replaced with like turf sections which are desirable.

A further object is to provide an apparatus for treating or conditioning turf which will provide access to the root structure without doing any appreciable damage to the surface or the body of the turf.

A still further object of the present invention is to provide an apparatus for and a process of treating or conditioning turf to improve it by forming a plurality of spaced, narrow grooves or slits therein, while firmly holding the turf against displacement as said grooves or slits are being formed.

Other objects and advantages of the present invention will become apparent from the following detailed description accompanied by the drawings in which.

Figure 1:
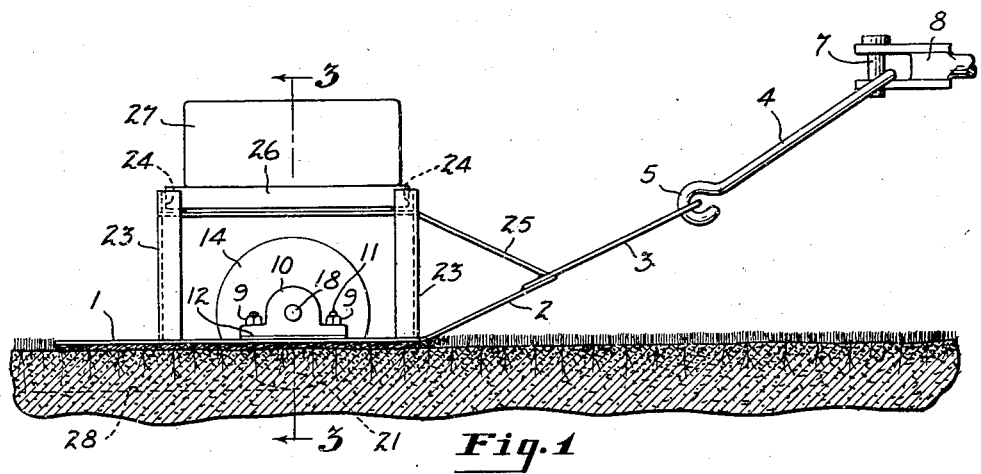
Figure 1 is a side elevation of a preferred form of apparatus embodying the present invention to illustrate how it may be used to improve turf.
Figure 2:
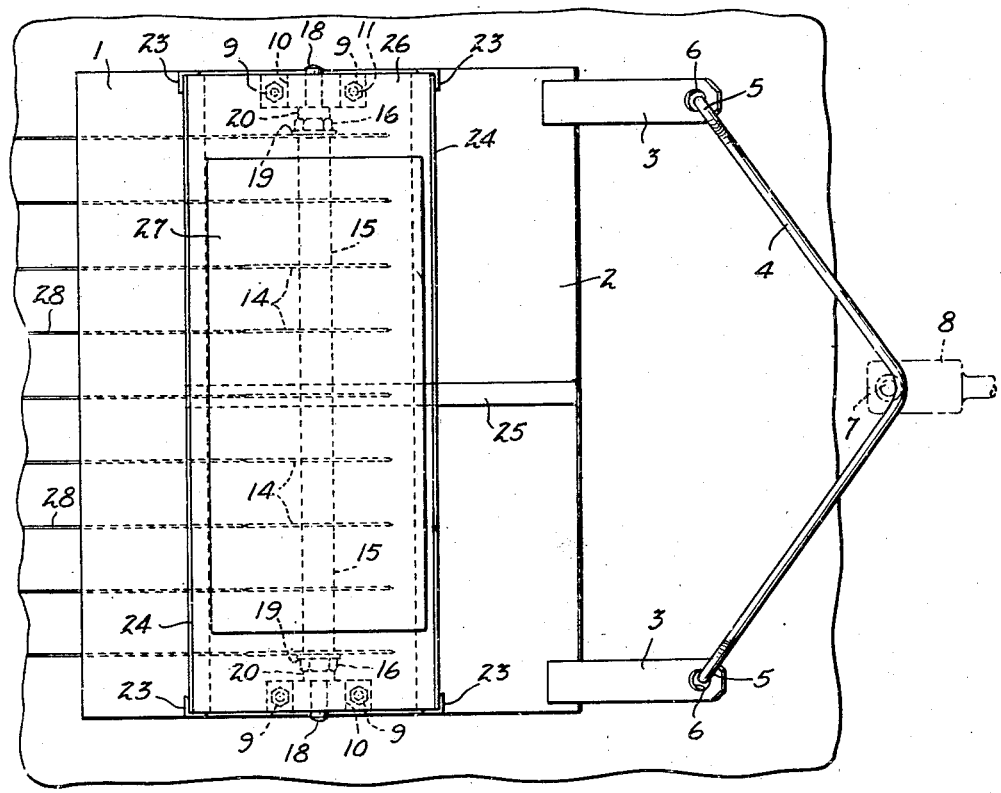
Fig. 2 is a top plan view of the device shown in Fig. 1 in position on an area of turf.

Figs. 1 and 2 illustrate a preferred form of apparatus embodying the present invention and how it may be used in treating or conditioning turf to improve the same in accordance with the present invention. The device comprises a bottom plate 1 adapted to engage and be supported on the turf and to slide therealong as the device is advanced over the area to be treated. To facilitate the sliding advancement of the device, the plate 1 is provided with an angularly disposed forward edge flange 2 which is inclined upwardly and permits the plate 1 to accommodate itself to changes in contour of the turf. Tongues or bars 3 may be attached to the leading edge of the inclined portion 2 of the plate 1 to permit attachment of a suitable towing mechanism used to advance the device. One such form of towing mechanism is shown in Figs. 1 and 2, and it will be understood that many other means could be employed equally well to connect the device to a source of power.

The mechanism shown includes a V-shaped yoke or towing link 4, the free ends of which terminate in hooked shaped portions 5 which are detachably connected to the bars 3 through apertures 6 in the bars 3. At its apex the link 4 passes around a pin 7 carried by a towing attachment indicated generally by the numeral 8. The attachment 8 may be connected to or carried by any suitable source of motive power such as, for example, a tractor.

The bottom plate 1, approximately centrally of its ground engaging portion, carries near its transverse edges journal brackets 10. The brackets may each be secured to the plate 1 by the use of screws or bolts 11 which pass through the plate 1 and the brackets 10 and have their heads countersunk into the bottom surface of the plate. The brackets are held onto the plate by nuts 9 which are threadedly mounted on the bolts and bear against the brackets to securely hold them to the plate.

Figure 6:
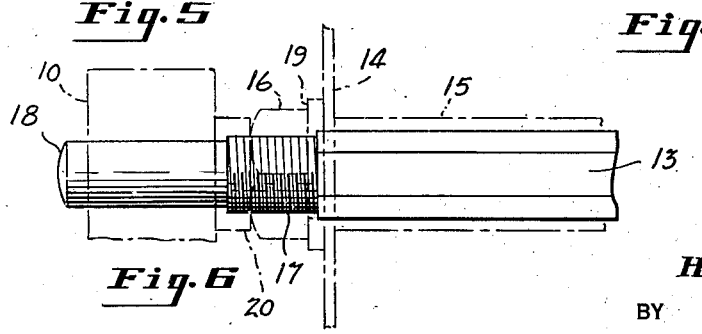
Fig. 6 is an enlarged fragmentary sectional view of a portion of the treating device to illustrate details of its construction.

To make the brackets vertically adjustable with respect to the plate and thus permit a change in the depth of the engagement of the device with the turf, one or more shims 12 may be inserted between the brackets 10 and the plate 1. Between the brackets 10 and mounted therein for rotation is a shaft 13, the major portion of which has a hexagonal cross section as may be best seen in Figs. 3 and 6. The shaft 13 carries a plurality of disks 14 which may be secured for rotation with the shaft by means of a hexagonal aperture therethrough having a sliding fit with the hexagonal portion of the shaft 13. The disks 14 are spaced at the desired intervals by cylindrical spacers 15 and are held against movement longitudinally of the shaft by nuts 16 which threadedly engage the shaft on reduced threaded portions 17 at each end of the hexagonal portion of the shaft. Washers 19 may be interposed between the end disks 14 and the nuts 16 to space such disks and hold them onto the portion of shaft 13 having a hexagonal cross section. Adjacent the threaded portions of the shaft is a further reduced portion 18 which is received and journaled in the journal brackets 10. The journal brackets may be provided with roller bearings in the conventional manner with the inner raceway thereof secured to the reduced end portion 18 of the shaft 13. Suitable spacers 20 may be interposed on the shaft to space the nuts 16 from the journal brackets 10.

Figure 3:
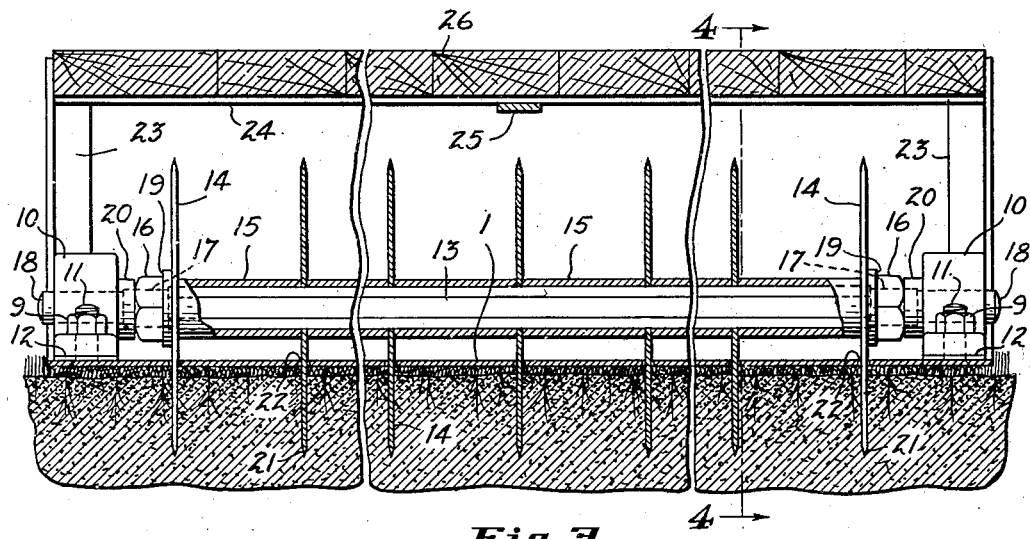
Fig. 3 is an enlarged elevational fragmentary view in section, taken substantially on line 3—3 of Fig. 1 to portray the construction and operation of the apparatus.
Figure 4:
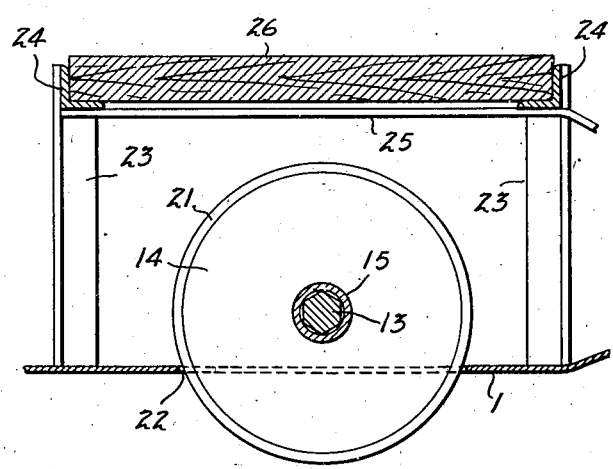
Fig. 4 is an enlarged side elevational view in section taken substantially on line 4—4 of Fig. 3.

The disks 14 which rotate with the shaft have peripheral portions which may be beveled to form a cutting edge, as indicated by the numeral 21 in Figs. 3 and 4, so that the disks 14 will cleanly slice the turf and not tear or deface it. The shaft 13 is so located with respect to the plate 1 that the peripheral portions of the disks 14 extend through slots or apertures 22 in the plate 1. The slots 22 are relatively narrow and of sufficient length to permit portions of the disks 14 to project therethrough, being closely fitted to the disks so that the plate 1 and its portions surrounding the apertures 22 will hold the turf against displacement during rotation of the disks.

To cover the disks from above and to support suitable weights which will cause the plate 1 to firmly engage the turf as it is advanced thereover, a housing is disposed on the plate 1. This may be formed by four corner posts shown in the drawing as angle bars 23 which extend upwardly to a point above the periphery of the disks 14. Connecting the angle bars 23 in pairs at the top thereof are horizontally extending angle bars 24 which extend transversely of the plate 1. Extending between the angle bars 24 and firmly secured thereto, a bracing strap 25 may be provided, and as shown in the drawing one such strap is employed which extends forward and downward where it may be secured to the leading edge of the upwardly inclined portion 2 of the plate 1. The connection between the plate 1, angle bars 23, angle bars 24, and the bracing strap 25, may all be by welding, riveting, or any other suitable manner which will firmly hold the pieces together and in fixed relation with respect to each other. Disposed in the angle of the horizontal angle bars 24 and either resting thereon or secured thereto may be a plank 26 which serves as a cover for the housing around the disks 14 and at the same time may be used to support a suitable weight such as indicated by the numeral 27 in Figs. 1 and 2. The weight 27 may be provided as shown by a block of relatively heavy material, or may be provided by having helpers, who assist in operating the device, stand on the plank 26 during the operation of the device.

In operation, the bottom plate 1 of the device is placed in position on the turf to be treated and, after being suitably weighted, is pulled along the turf. The weighting of the device causes the disks 14 to cut into the turf so that the peripheral portions of the disks, which project below the bottom surface of the plate 1, cut slits or narrow grooves, indicated by the numeral 28 in Fig. 2, while the device is advanced along the turf. With the plate 1 being held firmly against the turf, and the portions of the plate at the margins of the apertures 22 closely fitting with the disks 14, the turf is held against displacement during the cutting or slicing of the grooves 28. With the disks 14 being of relatively narrow thickness and being disposed so that their plane is parallel with the path of travel of the device, the grooves 28 are cleanly cut in the turf and there is a minimum of tearing or other disfiguring of the turf. The disks 14 are permitted to project through the plate 1 a sufficient distance so that the grooves 28 will reach approximately to the bottom of the root structure of the turf.

In treating the turf, the device may be drawn over the area to be treated in at least one direction so that a plurality of relatively narrow parallel grooves 28 are formed at spaced intervals throughout the turf. Since these grooves extend to the root structure of the turf, the soil is aerated and the root structure of the turf is exposed to any treating compositions, whether liquid or solid, which may be spread along the turf.

For example, a quantity of suitable fertilizer and/or a suitable top dressing, such as humus or the like, may be spread over the surface of the turf which it is desired to condition. The turf may then be treated by the device shown in the drawings to form grooves 28 in the turf to the approximate depth of the root structure. The action of the disks 14 and of the bottom plate 1 operate to work the material spread on the surface well into the root structure. Also, the channels or grooves 28 give direct access to the root structure for suitable treating compositions, whether solid or liquid. After the device has been drawn over the area in one or more directions, watering of the turf will carry additional top dressing or fertilizer directly to the root structure. The forming of grooves through the turf, as well as the working of top dressing into the turf, will serve to aerate the turf soil and enable water to more readily reach the root structure and promote a deeper growth of the root structure. Since direct access to the roots is obtained, care must be utilized in the selection of treating compositions, such as fertilizer, so that the root structure of the turf is not killed by the direct action of too strong a fertilizer.

In addition, the portions of the plate 1 to the rear of the disks 14, being firmly pressed against the turf after the formation of the grooves therein, will tend to close the grooves and render the turf porous and sponge-like. When top dressing is used the plate will operate to enclose particles of the top dressing into the root structure and soil, lightening and aerating it.

The formation of the grooves in turf has been found to be extremely beneficial without the use of any treating compositions. In time, as the apparatus is passed over the turf in varying directions and at varying locations in the same direction, all of the turf will be treated by the apparatus and process embodying the present invention.

Figure 5:
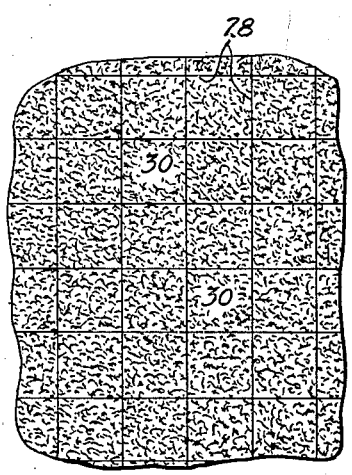
Fig. 5 is a top plan view of a section of turf which has been treated according to the present invention.

If the device is operated over a section of turf in two intersecting paths at right angles to each other, the grooves 28 will form a plurality of relatively small turf sections isolated from each other by grooves 28 as may be seen in Fig. 5. These sections are indicated by the numeral 30, and it will be readily apparent that if in the area which has been treated some of the sections 30 contain undesirable turf, such as for example too many weeds, diseased or mutilated turf, such sections may be readily removed and replaced with sections of similar size and shape taken from good, healthy turf areas. The ready replacement of turf sections is facilitated by the fact that the grooves 28 isolate the turf into sections and extend downwardly to the approximate depth of the root structure so that the sections are readily severable.

The diameter of the disks, their thickness and spacing, and the depth of the grooves formed thereby, are factors which may be varied according to the character of the turf and its existing root structure. Merely by way of example, it has been found that very satisfactory results are obtainable on a good healthy turf area of a golf green or fairway by the use of disks having an approximate diameter of 7 or 8 inches, a thickness of about ⅛ inch, with the disks being located about 3 inches apart along the shaft, and adjusted to form grooves of approximately 1½ to 2 inches depth.

It has been found that when turf is treated in accordance with the present invention, by a device such as that illustrated in the drawings, it will be more healthy and strong and provide a highly resilient surface which is especially desirable on golf courses. Such greens absorb larger quantities of rain because of the grooved structure which permits water absorption over the areas of the slits, in addition to surface absorption, and as a result the turf is left suitable for play and free from casual water that otherwise would be present. The grooves also serve as drainage mediums to remove water without rapid flow.

Where turf in an area adjacent to trees is treated, the disks will cut and sufficiently destroy surface roots of such trees so that such roots will be unable to absorb water and nutriment in that area to the detriment of the turf.

By the use of the present invention, turf may be conditioned or treated to aerate the root structure thereof and to greatly improve its strength, providing healthy turf structure. The device is so constructed that a minimum of damage occurs to the turf and its root structure by the treatment.

Due to the action of the follower portions of the plate 1 the relatively narrow grooves 28 will tend to be closed by the plate after the grooves are formed. This action is facilitated within a relatively short time by a growing together of the root structure in that area so that there is no disfigurement of the turf. Turf which has been treated is not impaired for use as a playing field for golf or the like immediately after treatment.

It will be understood that the foregoing description of preferred embodiments of the invention is not intended to limit the scope of the invention as described and claimed in the following claim.

What I claim is:

Apparatus for treating turf which comprises a bottom plate having a substantially horizontal flat body portion adapted to slide upon the turf and an upwardly inclined forward portion, said body portion having narrow laterally spaced slots intermediate the front and rear thereof, a shaft mounted above said body portion and extending transversely over said slots, a plurality of disks carried by said shaft, each projecting through one of said slots to slit the turf approximately to the depth of the root structure and be turned by engagement with the turf as the apparatus is dragged over the turf, said body portion substantially bridging the space between the disks and bearing against the turf.

HOMER H. HORTH.

REFERENCES CITED

The following references are of record in the file of this patent:

UNITED STATES PATENTS

| Number | Name | Date |
|---|---|---|
| 219,272 | Kieser | Sept. 2, 1879 |
| 648,253 | Goodman | Apr. 24, 1900 |
| 1,190,849 | Berriman | July 11, 1916 |
| 1,704,333 | McClelland | Mar. 5, 1929 |
| 1,795,182 | Ross | Mar. 3, 1931 |
| 2,050,739 | Sieverkropp | Aug. 11, 1936 |
| 2,267,943 | Ogg | Dec. 30, 1941 |